United States Patent [19]
Porter

[11] 3,812,386

[45] May 21, 1974

[54] PULSE CHARGE TO VOLTAGE CONVERTER

[75] Inventor: David Charles Porter, Dorchester, England

[73] Assignee: Integrated Photomatrix Limited

[22] Filed: Oct. 11, 1972

[21] Appl. No.: 296,587

[30] Foreign Application Priority Data

Oct. 29, 1971 Great Britain .................... 50396/71

[52] U.S. Cl. .................... 307/261, 307/238, 328/13, 328/151

[51] Int. Cl. .................... H03k 5/00

[58] Field of Search ........ 328/13, 14, 151; 307/238, 307/261

[56] References Cited

UNITED STATES PATENTS 3,636,458 1/1972 Sugiyama et al. .................... 328/151

*Primary Examiner*—John Zazworsky
*Attorney, Agent, or Firm*—Burns, Doane, Swecker & Mathis

[57] ABSTRACT

Apparatus for converting a sequence of electrical current pulses into a sequence of steady voltage levels having magnitudes significant of the charge content of the respective pulses includes an integrator for receiving the current pulses, via an input amplifier and one input of an adding network, and operative to perform integration of each pulse over its duration. A first follow and hold circuit is connected to the output of the integrator via a first gate circuit and is operative to follow the integrator output and hold the steady voltage level at the completion of the integration of a pulse. The output of the first follow and hold circuit is connected via a second gate circuit to a second follow and hold circuit for delivering the steady voltage corresponding to each current pulse until another voltage level corresponding to a succeeding current pulse is received from the first follow and hold circuit. The output of the first follow and hold circuit is also connected to a second input of the adding network via a third gate circuit to feed to the integrator simultaneously with the integration of a pulse a reset signal proportional to the steady voltage level corresponding to the integrated value of the preceding current pulse.

4 Claims, 11 Drawing Figures

PULSE CHARGE TO VOLTAGE CONVERTER

BACKGROUND OF THE INVENTION

This invention relates to apparatus for converting a sequence of electrical current pulses into a sequence of steady voltage levels each of which has a magnitude significant of the charge content of a respective current pulse.

It is envisaged that apparatus embodying the present invention will find particular application in the processing of a sequence of low level current pulses obtained from the scanning of an array of photodiodes. On sequentially scanning the diodes of such an array, a sequence of electrical current pulses is delivered by the array, each pulse indicating the level of illumination at a respective one of the diodes. The output from the array presents difficulties in further processing, firstly because of the low level of the current pulses and secondly because of the high periodic noise content of the output signal resulting from the clock signals used to effect the scanning of the array. Apparatus embodying the invention can provide an output arrangement for such an array which has a fast and stable response and is operative to convert the sequence of current pulses into a sequence of steady voltage levels which can be more readily processed.

According to the invention, there is provided apparatus for converting a sequence of electrical current pulses into a sequence of steady voltage levels each of which has a magnitude significant of the charge content of a respective current pulse, which apparatus includes an integrator for receiving the current pulses and operative to perform integration of each pulse over its duration, a follow and hold circuit for following the output from the integrator and for holding a steady voltage level corresponding to the output of the integrator at the completion of the integration of a pulse, resetting means for feeding to the integrator simultaneously with the integration of a pulse a reset signal proportional to the steady voltage level corresponding to the integrated value of the preceding current pulse so that the output of the integrator at the completion of the integration of a pulse is significant means receiving the steady voltage levels from the follow and hold circuit and operative to deliver the steady voltage corresponding to each current pulse until another voltage level corresponding to a succeeding current pulse is received from the follow and hold circuit.

In one form of the invention which is particularly suitable for use with a photodiode array, low level current pulses to be converted into steady voltage levels are first amplified and then fed to the integrator via one input of an adding network. The integrator has its output connected to the follow and hold circuit via a first gate circuit. The output of the follow and hold circuit is connected firstly through a second gate circuit to output means including a second follow and hold circuit, and secondly through a third gate circuit to another input of the adding network. The operation of the three gate circuits is controlled by a control pulse generator which reverses the normal condition of the gate circuits for the duration of each control pulse. The first gate circuit is normally open and the second and third gate circuits are normally closed. The output means may include a further stage, if desired, such stage serving to amplify the voltage level delivered by the second follow and hold circuit, to buffer the final output from the second follow and hold circuit and to provide additional filtering to remove switching transients.

BRIEF DESCRIPTION OF THE DRAWING

In order that the invention may be readily understood, an embodiment thereof which is suitable for use with a photodiode array will now be described in more detail, by way of example, with reference to the accompanying drawings, in which.

DETAILED DESCRIPTION

The embodiment of the invention now to be described is directly applicable to the processing of electrical current pulses such as are obtained by scanning an array of photodiodes. A sequence of such current pulses 1 to 4 is illustrated in FIG. 1A, and FIG. 1B shows capacitively coupled clocking noise comprising pulse 5, 6 which typically appears in the output signal from the diode array.

Figure 1A:
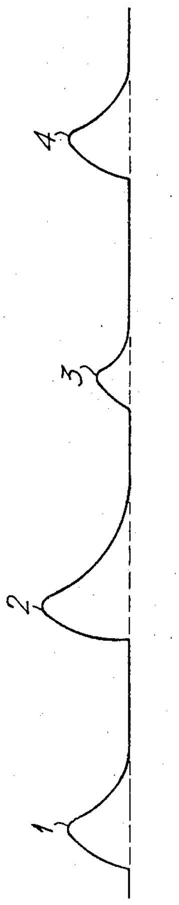
FIG. 1A is a diagram illustrating a sequence of current pulses obtained by scanning an array of photodiodes.
Figure 1B:
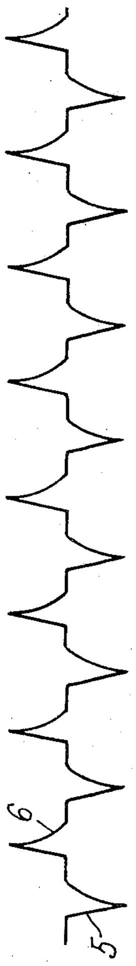
FIG. 1B is a diagram illustrating periodic clocking noise which is typically associated with the current pulses received from the photodiode array.
Figure 1C:
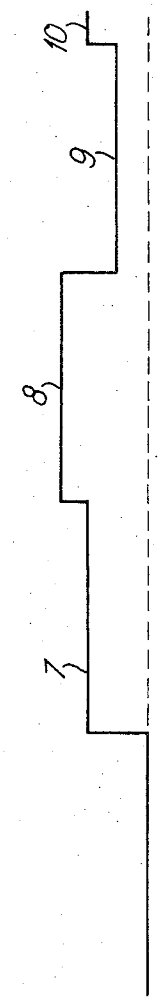
FIG. 1C is a diagram illustrating a sequence of steady voltage levels which are to be produced from the combined pulse sequences of FIGS. 1A and 1B and in which each voltage level is significant of the charge content of a respective current pulse.

FIG. 1C shows in idealized form the sequence of steady voltage levels 7 to 10 which is to be produced by apparatus embodying the invention in response to an input signal in the form of FIGS. 1A and 1B combined, each of the steady voltage levels 7 and 10 having a magnitude which is significant of the charge content of a respective current pulse 1 to 4 in FIG. 1A.

Figure 2:
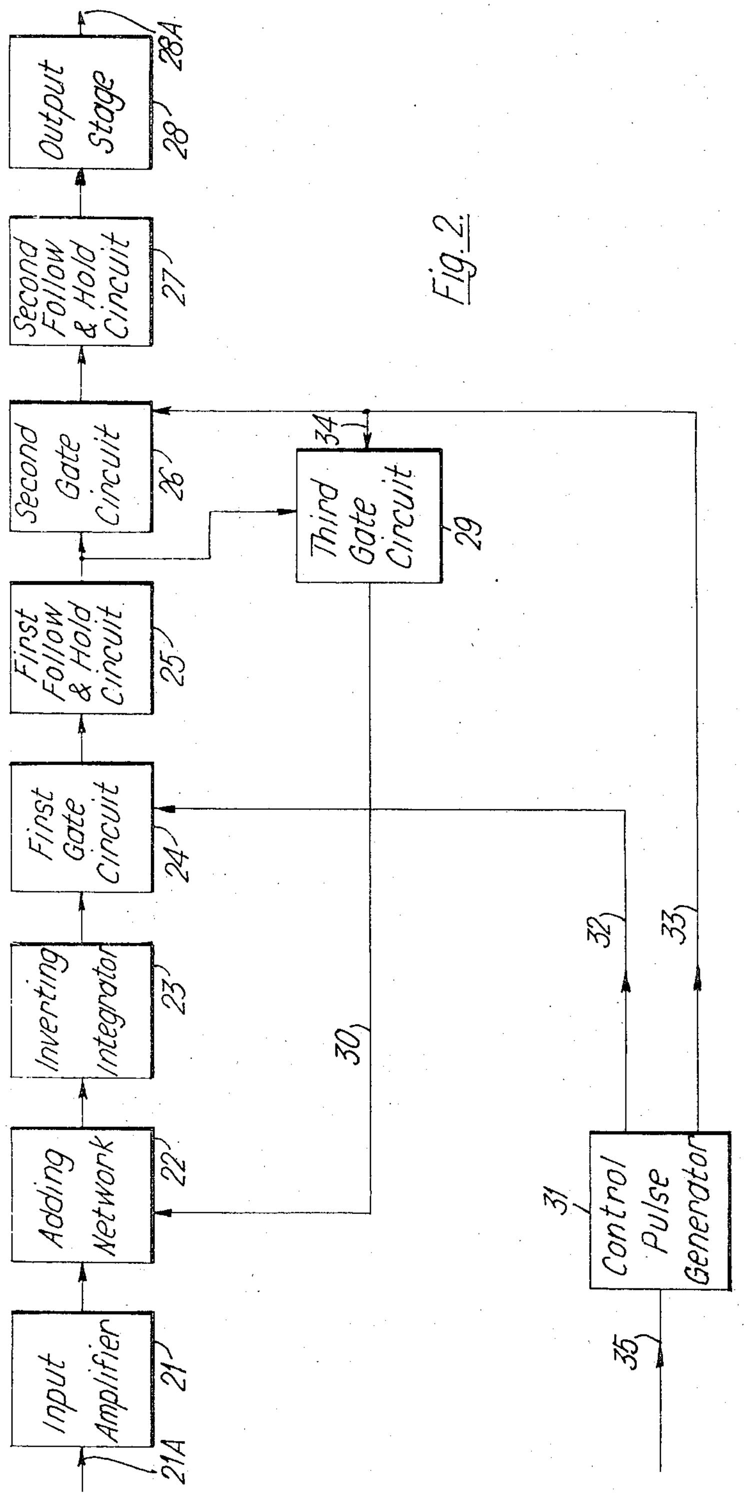
FIG. 2 is a block diagram illustrating an embodiment of apparatus according to the invention.

Referring now to the block diagram of FIG. 2, apparatus embodying the invention includes an input amplifier 21 which has its input 21A connected to receive current pulses from the photodiode array on scanning of such array. The amplifier 21 provides a correct voltage bias to the photodiode array in keeping with a net low drift characteristic with low input impedance and good bandwidth. Amplified pulses from the amplifier 21 are delivered to one input of a two input adding network 22 which has its output connected to an inverting integrator 23. The output of the integrator 23 is coupled via a first gate circuit 24 to the input of a first follow and hold circuit 25 whose output is delivered firstly to a second follow and hold circuit 27 via a second gate circuit 26, and secondly via a third gate circuit 29 and lead 30 to the other input of the adding network 22. The output of the follow and hold circuit 27 is fed to an output stage 28 which delivers the final output signal of the circuitry at an output terminal 28A. The operation of the three gate circuits 24, 26 and 29 is controlled by a control pulse generator 31 which delivers control pulses on leads 32, 33 and 34 and which reverses the normal condition of each gate circuit for the duration of each control pulse. The gate circuit 24 is normally open and the gate circuits 26 and 29 are normally closed. The pulse generator 31 is arranged to receive a start pulse on its input 35 denoting the commencement of an integration period as will appear hereinafter.

The operation of the FIG. 2 apparatus will now be described with reference to the waveform diagrams of FIG. 3. As appears from FIG. 3, the operating sequence of the circuitry is divided into cycles each of which is further subdivided into two periods, two cycles being required for the processing of each input current pulse.

The start of each cycle is denoted by a start pulse (see 3A in FIG. 3) being delivered to the control pulse generator 31 which then delivers a control pulse (see 3B in FIG. 3) to each of the gate circuits 24, 26 and 29, the duration (e.g., 0.5 $\mu$s) of such control pulse defining a first period of the cycle. For the duration of the control pulse, firstly the first gate circuit 24 is closed so that the first follow and hold circuit 25 holds whatever output voltage level it had at the start of the cycle, and secondly the second and third gate circuits 26 and 29 are opened so that the output voltage level of the first follow and hold circuit 25 is delivered to the second follow and hold circuit 27 and as a reset or feedback signal through lead 30 to the said other input of the adding network 22. For the second period of the cycle after the control pulse has been removed, the first gate circuit 24 is opened to transfer the output signal of the integrator to the first follow and hold circuit 25, while the second and third gate circuits 26 and 29 are closed so that the second follow and hold circuit 27 holds the output voltage level which it acquired during the first period of the cycle and the feedback signal from the first follow and hold circuit 25 to the adding network 22 is terminated.

To illustrate the basic mode of operation of the circuitry consider a single input current pulse (see 3C in FIG. 3) timed to arrive at the one input of the adding network 22 at the beginning of a cycle (denoted as cycle 1 in FIG. 3) and assume that no pulses have been received previously so that the integrator 23 is in a discharged condition and the voltage levels held by the follow and hold circuits 25 and 27 are zero.

During the first period of cycle 1 while a control pulse is delivered to the gate circuits 24, 26 and 29, the integrator receives from the adding network 22 an input consisting of the input pulse and a feedback signal from the first follow and hold circuit which in this instance is zero and may be ignored. The output signal from the integrator is consequently a signal corresponding to the inverted integral of the input current pulse (see 3D in FIG. 3). At the end of the first period of cycle 1, the gate circuits 24, 26 and 29 revert to their normal conditions so that the output signal of the integrator is delivered to follow and hold circuit 25 via gate circuit 24. During the second period of cycle 1, the integrator continues to integrate the input current pulse and a voltage level corresponding to the fully integrated input pulse appears and is held at the output of the follow and hold circuit 25 (see 3E in FIG. 3).

Figure 3:
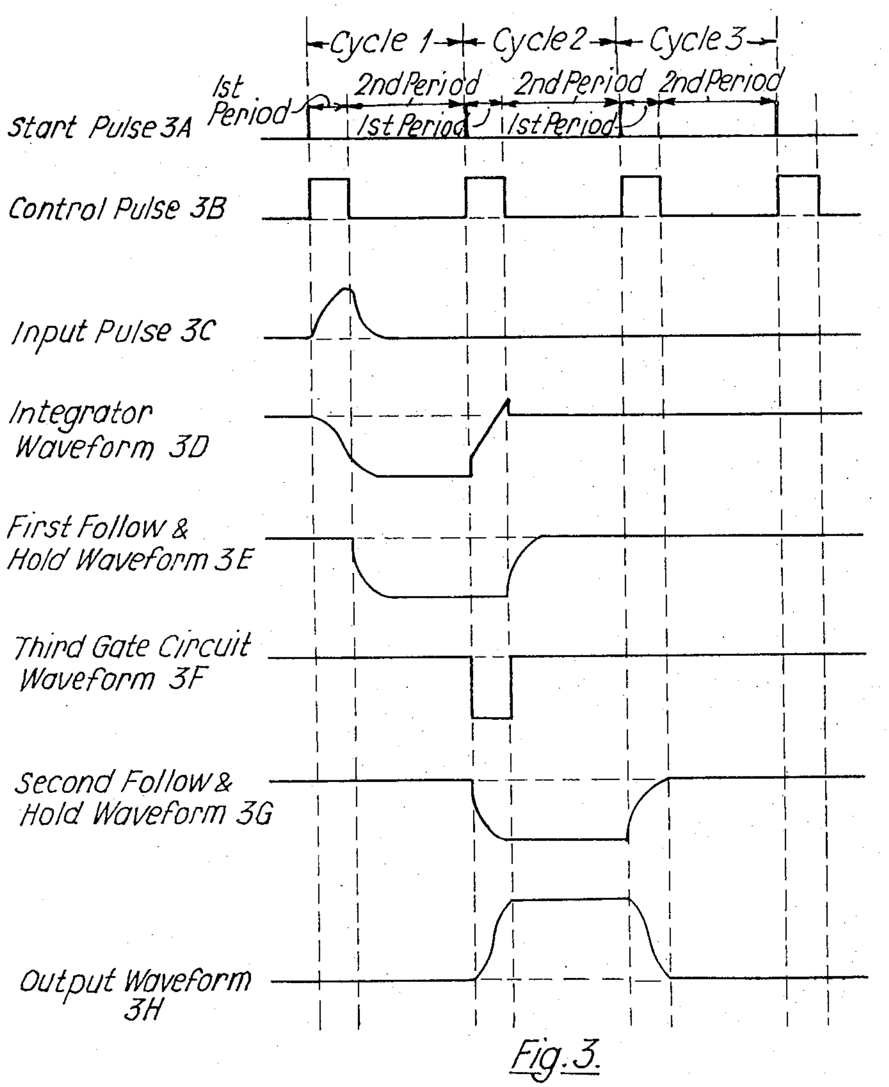
FIG. 3 is a diagram of the waveforms produced at various points in the circuitry of FIG. 2.

At the end of the second period of cycle 1, the control pulse generator 31 again delivers a control pulse to each of the gate circuits 24, 26 and 29 to define the first period of another cycle (cycle 2 in FIG. 3). During this first period of cycle 2, the follow and hold circuit is isolated from the integrator 23 by the closed gate circuit 24 and holds the voltage level which it achieved in the second period of cycle 1. Opening of the gate circuits 26 and 29 during the first period of cycle 2 enables the held level of the first follow and hold circuit 25 to be transferred to the second follow and hold circuit 27 (see 3G in FIG. 3) and a feedback signal to be fed to the adding network 22 (see 3F in FIG. 3).

The feedback signal to the adding network 22 is a signal of opposite polarity to the input pulse and will therefore commence to discharge the integrator back to zero at a rate proportional to the amplitude of the feedback signal. By taking the feedback signal from the first follow and hold circuit 25, it is arranged that, in the first period of cycle 2, the integrator is completely discharged. Thus, the larger the charge content of the input signal and hence the larger the charge acquired by the integrator, the larger is the feedback signal and hence the quicker is the rate of discharge. For no input pulse, no charge is acquired by the integrator and no feedback signal is provided.

The transfer of the voltage level held by the first follow and hold circuit 25 to the second follow and hold circuit 27 takes place simultaneously with the discharging of the integrator and the second follow and hold circuit 27 is adapted to acquire the full voltage level to be held within the first period of cycle 2.

For the second period of cycle 2, the gate circuits 24, 26 and 29 again revert to their respective normal conditions. The first follow and hold circuit 25 now acquires the zero output level of the integrator 23, the integrator feedback signal is removed and the second follow and hold circuit 27 retains on its output the voltage level corresponding to the fully integrated value of the input pulse.

Assuming that no further input pulses have been received, the next cycle of the apparatus (cycle 3 in FIG. 3) results in the zero output of the integrator 23 being transferred to the second follow and hold circuit 27 whose output returns to zero. The output waveform (3G in FIG. 3) of the second follow and hold circuit 27 resulting from the processing of a single input pulse (3C) as described hereinbefore is thus a voltage level having a magnitude significant of the charge content of the input pulse.

If, instead of a single pulse, a sequence of input pulses is received, the integration of a second input pulse arriving at the adding network 22 at the commencement of the first period of cycle 2 is integrated during such period by the integrator 23 simultaneously with the resetting of the integrator by the reset feedback signal fed back through gate circuit 29. As the feedback signal during this first period of cycle 2 is adapted to cancel exactly the charge of the preceding pulse which arrived at the beginning of the first period of cycle 1, the remaining charge and hence the output of the integrator 23 reached during the second period of cycle 2 corresponds to the integral (i.e., the charge content) of the second pulse. This second output level of the integrator 23 passes through the apparatus following the output level corresponding to the first pulse and replaces the otherwise subsequent zero at the outputs of the follow and hold circuits 25 and 27. Each subsequent pulse of the sequence of input pulses is processed in similar fashion and is integrated by the integrator 23 in summation with a feedback signal corresponding to the immediately preceding input pulse. The output voltage waveform at the second follow and hold circuit 27 is thus a stepped waveform in which the voltage level of each step is significant of the charge content of a respective input current pulse.

The output stage 28 of the apparatus serves to receive the output voltage from the second follow and hold circuit 27 and delivers a final output waveform (see 3H in FIG. 3 for final output corresponding to a single pulse). The stage 28 performs three functions, namely to amplify the output voltage of the second follow and hold circuit 27, to provide a buffer stage between the output terminal of the apparatus and the second follow and hold circuit, and to provide filtering to remove switching transients which appear in the output voltage waveform delivered by follow and hold circuit 27.

Having now described the basic arrangement and operation of the apparatus embodying the invention, examples of the various stages of the apparatus will now be described in more detail with reference to the circuit diagrams of FIGS. 4 to 9.

Figure 4:
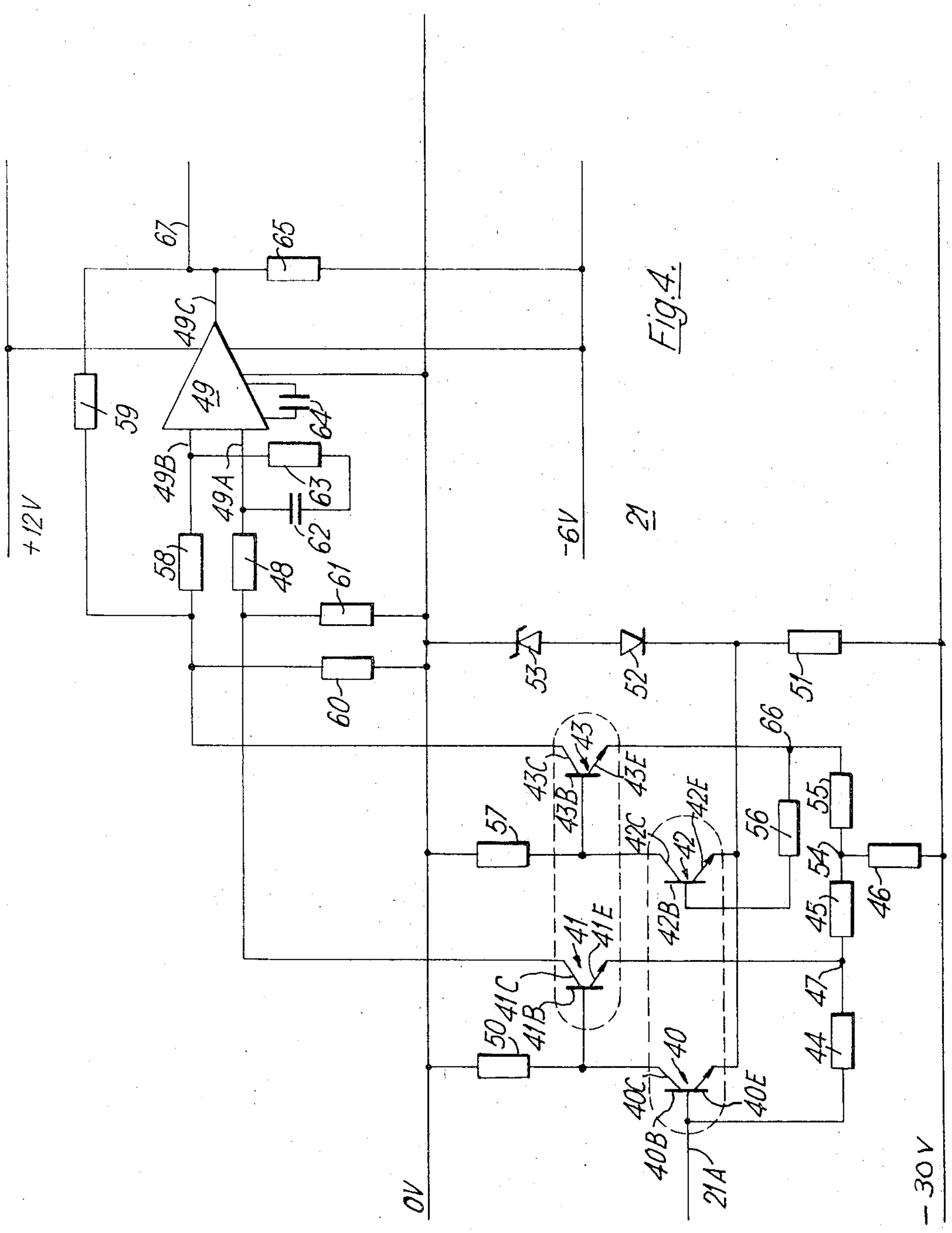
FIG. 4 is a circuit of the input amplifier in the embodiment of FIG. 2.

FIG. 4 illustrates one form which the input amplifier 21 may take. As shown in FIG. 4, amplifier 21 includes two transistor pairs 40, 42 and 41, 43 (respectively of the BCY 87 and BCY 89 types). The base 40B of transistor 40 is connected to input 21A for receiving input current pulses and via resistors 44, 45 and 46, respectively of 22K, 220Ω and 10K, to a negative supply line of − 30 volts. The junction 47 of resistors 44 and 45 is connected to the emitter 41E of emitter follow transistor 41 which has its base 41B connected to the collector 40C of transistor 40 and its collector 41C connected via a 2.2K resistor 48 to one input 49A of an integrated circuit differential amplifier 49 of μA 702 type. The collector of transistor 40 is connected via a 220K load resistor 50 to a positive supply line at zero volts. A series circuit comprising a 10 K resistor 51, a diode 52 of the 1N4148 type and a zener diode 53 (10 volts) is connected between the negative and positive supply lines and the emitter 40E of transistor 40 is connected to the junction of resistor 51 and diode 52.

The junction 54 of resistors 45 and 46 is connected to the emitter 43E of transistor 43 via a 220Ω resistor 55 and via a 22K resistor 56 to the base 42B of transistor 42. The emitter 42E of transistor 42 is connected to the emitter 40E of transistor 40. The emitter 42E of transistor 42 is connected to the emitter 40E of transistor 40 and the collector 42C of transistor 42 is connected via 220K load resistor 57 to the positive supply line. The base 43B of transistor 43 is coupled to the collector 42C of transistor 42 and the collector 43C of transistor 43 is connected through a 2.2K resistor 58 to another input 49B of amplifier 49. A 3.9K feedback resistor 59 is connected between the output 49C and the second input 49B of the amplifier 49 and resistors 60 and 61, respectively of 680 and 560Ω, are connected to the collectors of transistors 43 and 41 respectively. An input RC combination of a 3,300pF capacitor 62 and a 68Ω resistor 63 is connected between the first and second inputs 49A and 49B of the amplifier 49 and a 56pF interstage capacitor 64 is provided for such amplifier. A 1K resistor 65 is connected between the output 49C of the amplifier 49 and a supply line at −6V.

The operation of the FIG. 4 circuit is as follows. An initial current gain is achieved using transistors 40 and 41. Thus an input current pulse at 21A drives the collector 40C of transistor 40 in the opposite direction to the base voltage produced by the input current. The emitter follower transistor 41 provides a low impedance transfer to the point 47 of this change in the collector voltage of transistor 40 and a reverse current consequently flows in resistor 44 in a sense to oppose the input current. Transistor 40 has a high voltage gain so that the reverse current in resistor 44 cancels the major portion of the input current and the change in voltage at point 47 is therefore substantially equal to the input current multiplied by the value of resistor 44.

As the voltage changes at point 47, a change in current occurs in resistors 45, 46 and 55. Since point 66 is the low impedance emitter connection of transistor 43 and resistor 46 is of significantly greater value than 45 and 55, most of this change in current flows through resistors 45 and 55 and the change in current is equal to the voltage change multiplied by the reciprocal of the sum of the values of resistors 45 and 55. As the voltage change in this network is caused by the emitter 41E of transistor 41, the change in current will flow into the emitter of such transistor and through to the collector 41C reduced only by the small base current of the transistor 41. This change in the collector current of transistor 41 can be seen to be equal to the input current amplified by the ratio of the value of resistor 44 to the sum of the values of resistor 44 to the sum of the values of resistors 45 and 55 and in this form of the circuit is approximately 50. The emitter of transistor 43 constitutes the sink for the current change and thus undergoes the same change in current as transistor 41 but in the opposite direction. Consequently, an equal but opposite change of current occurs at the collector 43C of transistor 43 and the difference between the change in collector currents of transistors 41 and 43 thus represents a current change of approximately 100 times the input current. Resistor 46 provides current bias for transistors 41 and 43.

The two transistors 42 and 43 provide a balance of the bias currents in the transistors 40 and 41 such that the differential current output between the collectors 41C and 43C of transistors 41 and 43 are free from drift which can arise from changes in temperature and supply voltages. This balancing effect is further enhanced by using two closely matched transistor pairs 40, 42 and 41, 43.

The bias voltage of the base 40B of transistor 40 is stabilised by the diode resistor arrangement 51, 52 and 53. The voltage of the base 40B of transistor 40 is displaced by an amount equal to the sum of the reference voltage (10 volts) of zener diode 53 and the voltage drop across the diode 52 made of the same semiconductor material as transistor 40 and conducting forward current. The voltage drop across diode 52 and the base emitter voltage of transistor 40 cancel leaving the base voltage and the input 21A at a voltage equal to the reference voltage of zener diode 53. Resistor 51 provides sufficient bias to hold zener diode 53 and diode 52 conducting.

The output currents from the collectors of transistors 41 and 43 are fed to the amplifier 49 whose gain is determined by feedback resistor 59 and which gives an output of 3.9 volts per milliampere of difference between the two input currents. Resistor 61 connected to the collector 41C of transistor 41 is of lower value than resistor 60 connected to the collector 43C of transistor 43 to compensate for the effective parallel loading of resistor 60 by feedback resistor 59.

Capacitors 62 and 64 together with resistors 58, 48 and 63 provide frequency stabilization for amplifier 49 and resistor 65 improves the otherwise poor negative drive of the amplifier.

The output delivered at the output 67 of the circuit is thus an amplified pulse corresponding to the input pulse, the overall gain being 390V/mA.

Figure 5:
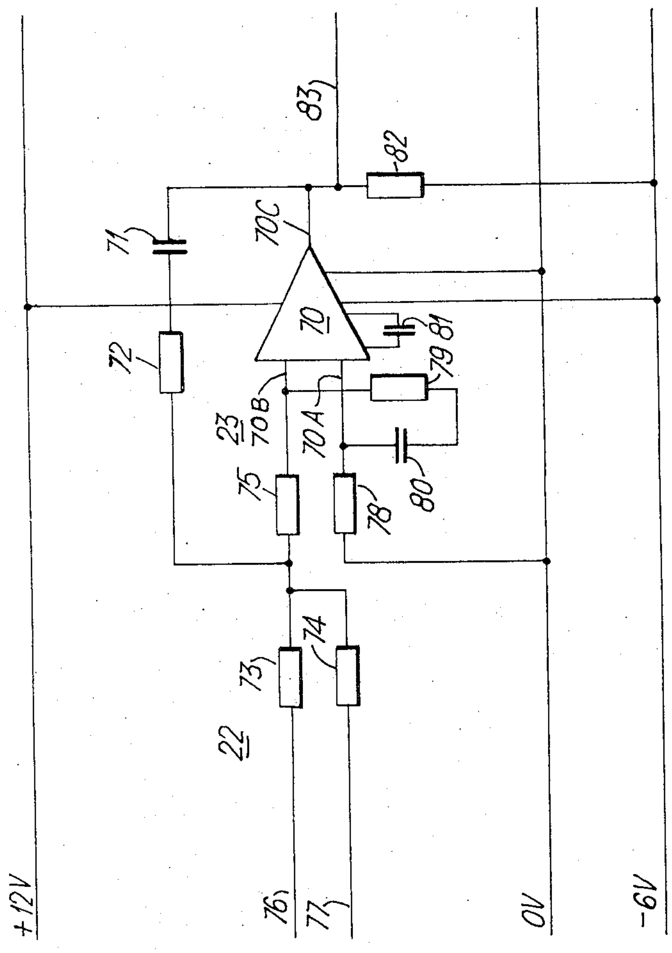
FIG. 5 is a circuit diagram of the adding network and integrator in the embodiment of FIG. 2.

FIG. 5 illustrates circuitry for the adding network 22 and inverting integrator 23. As shown in FIG. 5, the integrator 23 is constituted by an integrated circuit amplifier 70 of the same type as amplifier 49 (FIG. 4), having an R.C. feedback loop composed of a 220pF capacitor 71 and a 680Ω resistor 72. The amplifier 70 has a high negative gain sufficient to allow the input voltage and current to be ignored at full output so that the overall transfer function is defined by the feedback loop.

An adding network 22 comprising resistors 73 and 74, respectively of 10K and 1.2K, is connected via a 2.2K resistor 75 to one input 70B of the amplifier 70, the resistor 73 being connected to an input 76 for connection to the output 67 of the input amplifier 49 and the resistor 74 to an input 77 for receiving the reset feedback signal from gate circuit 29 (see FIG. 2).

The other input 70A of the amplifier 70 is connected via a 2.2K resistor 78 to a supply line at 0 volts and the two inputs 70A, 70B of the amplifier are coupled together by a series R.C. loop comprising a 68Ω resistor 79 and a 3,300pF capacitor 80. A further 56pF interstage capacitor 81 is connected to the amplifier 70 which receives supply voltages from supply lines at − 6 volts and + 12 volts, and a 680Ω resistor 82 is connected between output 70C of the amplifier and the − 6 volts supply line.

The operation of the FIG. 5 circuit is as follows. An input voltage at input 76 will initially cause the output 70C of the amplifier 70 to change in the opposite direction as a result of the high negative gain of the amplifier. This will cause a feedback current to flow in the feedback loop 71, 72, such feedback current causing the voltage at the one input 70B of the amplifier 70 to be maintained at zero. In order to maintain the input at zero, the current in the feed-back loop effectively balances the input current and the output voltage required to be produced by the amplifier by the amplifier 70 to maintain this equilibrium is that required to provide the necessary current in the feedback loop. The voltage across capacitor 71 will be equal to the integral of the feedback current flowing through it and voltage across the resistor 72 will be directly proportional to the feedback current, and the required output voltage at 70C will be the sum of these two voltages. Consequently, the output voltage of the amplifier 70 and at the output

83 of the circuit will correspond to the negative integral of the input voltage plus a proportional component which will be seen later to compensate for a complementary effect which arises in a subsequent follow and hold circuit.

As the input voltage of the amplifier 70 does not change, there is no interaction between signals applied at input 76 and 77 so that input signals applied at these inputs may be regarded as independent and the output of amplifier 70 is simply a combined output which is the sum of the outputs which would be obtained for the two signals if applied singly. The circuitry of FIG. 5 thus performs both the required adding function and the negative integration function.

Resistors 75, 78 and 79 together with capacitors 80 and 81 provide frequency stabilization and resistor 82 improves the otherwise poor negative drive of the amplifier 70.

Figure 6:
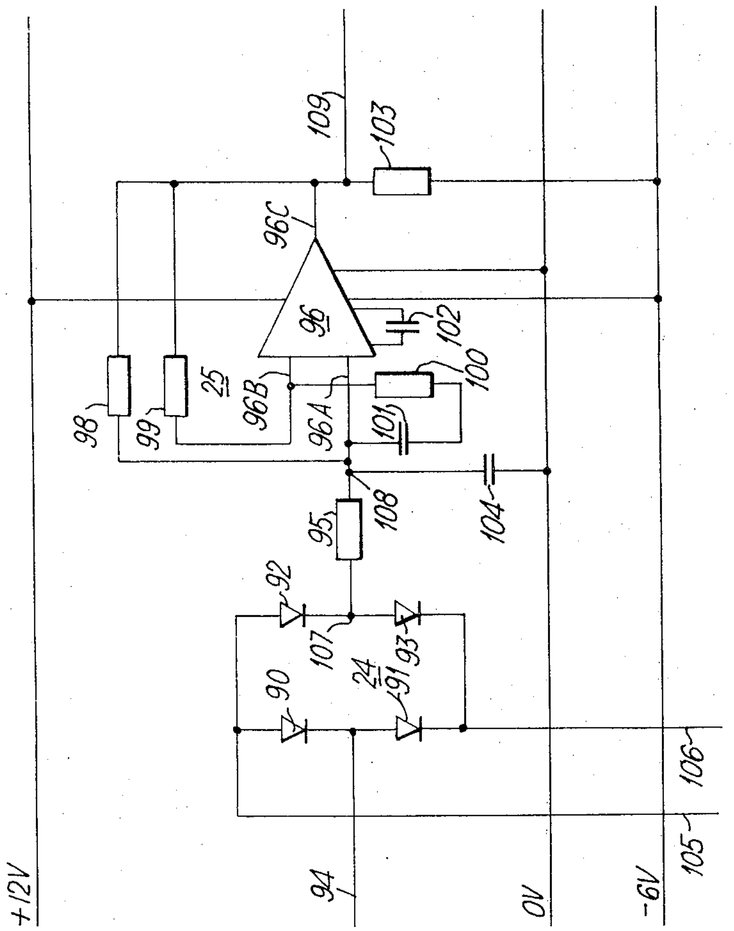
FIG. 6 is a circuit diagram of the first gate circuit and the first follow and hold circuit in the embodiment of FIG. 2.

FIG. 6 illustrates circuitry for carrying out the functions of the first gate circuit 24 and the first follow and hold circuit 25 of the apparatus of FIG. 2. As shown in FIG. 6, gate circuit 24 comprises four diodes 90 to 93 of N4148 type connected in a bridge network. The junction between diodes 90 and 91 is connected to an input 94 for receiving the output voltage from output 83 of the adding and integrating circuitry of FIG. 5. The junction between diodes 92 and 93 is connected via a 390Ω resistor 95 to one input 96A of an amplifier 96 similar to amplifier 49 of FIG. 4 and having feedback from its output 96C to its one input 96A via a 4.7K resistor 98 and to another input 96B via a 4.7K resistor 99. The two amplifier inputs 96A, 96B are coupled together by a series RC circuit comprising a 68Ω resistor 100 and a 3,300pF capacitor 101, and a 56pF interstage capacitor 102 is provided for the amplifier 96. The amplifier receives a supply voltage from a negative supply line of − 6 volts and a positive supply line of + 12 volts, and a 680Ω resistor 103 is connected between the output 96C of the amplifier 96 and the −6 volts supply line. A 390pF capacitor 104 is connected between one input 96A of the amplifier 96 and a supply line at zero volts.

The junction between diodes 90 and 92 and the junction between diodes 91 and 93 are connected to respective control inputs 105 and 106 connected to receive control pulses from the control pulse generator 31 (see FIG. 2).

The operation of the FIG. 6 circuitry is as follows: when a voltage is applied between control inputs 105 and 106 in a direction to cause conduction of the diodes 90 and 93, there will be a low impedance path between input 94 and point 107, and an input voltage applied to input 94 will be transferred to point 107. When the voltage between control inputs 105 and 106 is removed, the diodes 90 to 93 will cease to conduct and present a high impedance electrically isolating point 107 from input 94.

The voltage at point 107 charges the capacitor 104 through resistor 95 and the voltage across the capacitor at 108 constitutes the input to the amplifier 96 which forms the follow and hold circuit 25 and has a high impedance and a gain of unity. When the voltage at point 108 is changing due to the transfer of an input voltage from input 94 to point 107, the output voltage of the amplifier 96 follows the change in voltage. When the diodes 90 to 93 are rendered non-conducting, the charge on capacitor 104 is retained and appears as a low impedance voltage at the circuit output 109.

An input delay is caused by the R.C. circuit 104, 95 and is compensated for by the proportional component of the integrator output referred to in connection with the description of FIG. 5.

The amplifier 96 has a high differential gain and the voltage difference between the two input terminals 96A, 96B thereof remains substantially zero for the full output swing. Feedback is applied to the second input (inverting input) via resistor 99. In this manner, if the output voltage is initially more negative then the input voltage applied to the first input 96A (non-inverting input), the output will change in the positive sense until the difference between the two amplifier inputs is zero and equilibrium is achieved. Similarly any other input to the first input 96A of the amplifier 96 from point 108 will result in imbalance causing the output to follow the change in input to restore the balance. In the balanced condition of the amplifier both inputs and the output of the amplifier are at substantially the same voltage.

To prevent input bias current of the amplifier 96 from rapidly discharging capacitor 104, two feedback resistors 98 and 99 are used to provide current to the respective inputs 96A, 96B from the output 96C. Assuming that the input bias currents are equal, the voltage drop across each of the resistors 98 and 99 is the same thereby maintaining a balanced input voltage difference between input and output is small enough to be ignored.

Resistors 95, 100 and 103 together with capacitors 101 and 102 provide frequency stabilization for the amplifier 96 and the resistor 103 improves the otherwise poor negative drive of the amplifier.

Figure 7:
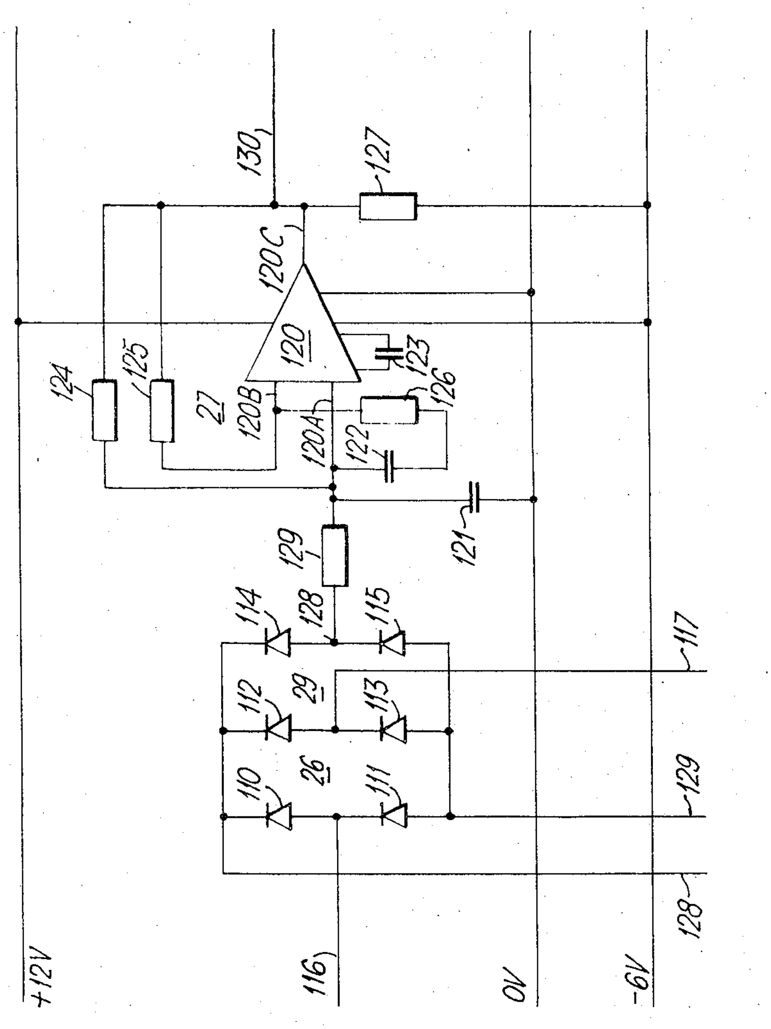
FIG. 7 is a circuit diagram of the second and third gate circuits and the second follow and hold circuit in the embodiment of FIG. 2.

FIG. 7 illustrates a possible form of circuitry providing the second and third gate circuits 26 and 29 and the second follow and hold circuit 27 (see FIG. 2). This circuitry is like that of FIG. 6 except for the portion of the circuitry which functions as the second and third gate circuits 26 and 29. Each of the second and third gate circuits 26, 29 could be embodied as a separate diode bridge like that in FIG. 6 which represents the first gate circuit 24. However, since the second and third gate circuits 26, 29 also operate in synchronism, they have been partially merged in FIG. 7 to form a diode network 110 to 115 of three parallel branches each including a pair of series-connected diodes. An input 116 for receiving the output voltage from output 109 in FIG. 6 is connected to the junction between diodes 110 and 111, an output terminal 117 is connected to the junction between the diodes 112 and 113 and the junction 128 between diodes 114 and 115 is connected via a 390Ω resistor 129 to a first non-inverting input 120A of integrated circuit amplifier 120 which is similar to amplifier 49 of FIG. 4. The amplifier 120 is connected in a similar arrangement to that of amplifier 96 of FIG. 6, with capacitors 121, 122 and 123 respectively of 390pF, 3,300pF and 56pF and resistors 124, 125, 126 and 127 respectively of 4.7K, 4.7K, 68Ω and 680Ω. The output terminal 117 is connected to the input 77 of the adding network 22 (see FIG. 5) for feeding a resetting feedback signal to the adding network. The common junction between diodes 110, 112 and 114 and the common junction between diodes 111, 113, and 115 are respectively connected to two control input terminals 128 and 129 like control inputs 105 and 106 of FIG. 6 and similarly connected to receive control pulses from the control pulse generator 31 (see FIG. 2).

Briefly, the operation of the FIG. 7 circuit is as follows. When a voltage is applied to input terminals 128 and 129 in a sense to render the diodes 110 to 115 conducting, an input voltage on input 116 will be gated through to the output terminal 117 and to point 128 which causes charging of the capacitor 121 through resistor 129. As described for the amplifier 96 of FIG. 6, this change in the input voltage to amplifier 120 is reproduced at the output 120C of the amplifier and consequently at the circuit output 130.

Figure 8:
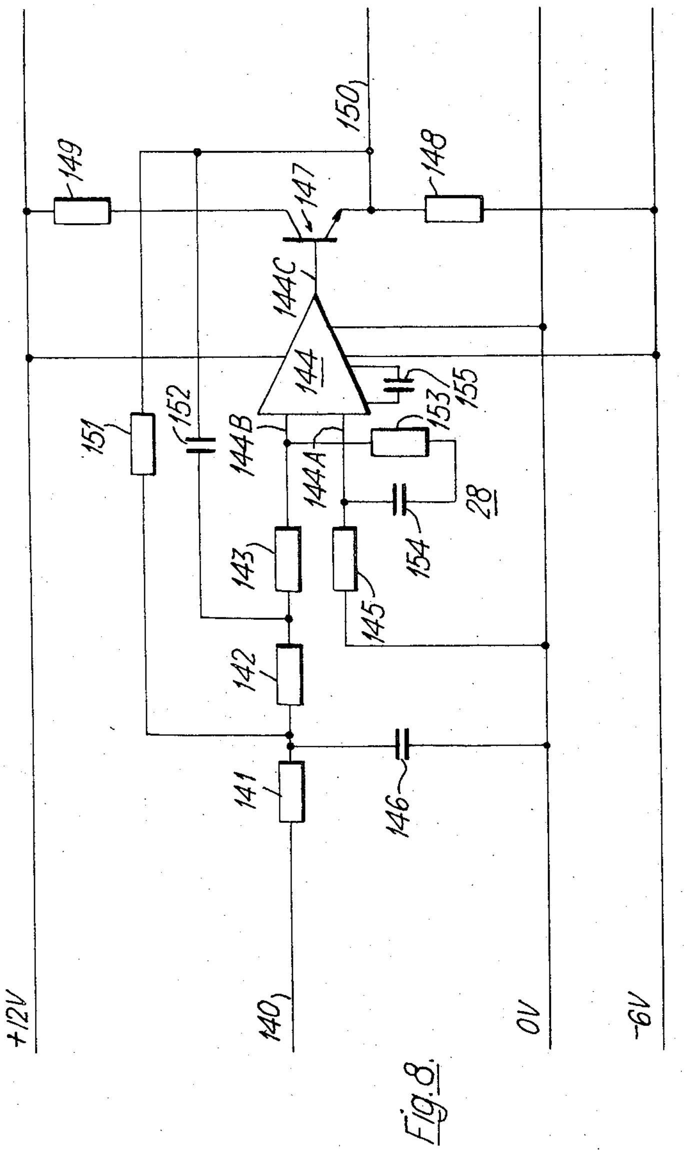
FIG. 8 is a circuit diagram of the output amplifier and buffer stage in the embodiment of FIG. 2.

FIG. 8 illustrates suitable circuitry for the output stage 28 of the apparatus of FIG. 2. As shown in FIG. 8, the output stage has an input 140 for connection to the output 130 of the amplifier 120 of FIG. 7. The input 140 is connected via resistors 141, 142 and 143, respectively of 1K, 1K and 2.2K, to the inverting input 144B of an integrated circuit amplifier 144 like amplifier 49 (FIG. 4), whose non-inverting input 144A is connected via 2.2K resistor 145 to a supply line at zero volts. A 12pF capacitor 146 is connected between the junction of resistors 141 and 142 and the line at zero volts. The output 144C of amplifier 144 feeds an emitter follower stage 147 of 2N4275 type having a 680Ω emitter load resistor 148, a 68Ω collector resistor 149 and an output 150 forming the circuit output. A resistive feedback loop including a 3K resistor 151 extends between the output 150 and the junction of resistors 141 and 142, and a capacitive feedback loop including a 15pF capacitor 152 is connected between the output 150 and the junction of resistors 142 and 143. The inputs 144A and 144B are coupled by a series circuit comprising a 68 resistor 153 and a 3,300pF capacitor 154, and an interstage capacitor 155 of 36pF is provided for the amplifier 144.

The operation of the FIG. 8 output stage is such that an input voltage is amplified with a negative gain of approximately 3 and presented at the output terminal 150 at a low output impedance. The resistors 141, 142 and 151 and capacitors 154 and 155 provide a high frequency cut-off together with the gain of 3, and serve to compensate delay arising from the presence of resistor 129 and capacitor 121 in the preceding circuit of FIG. 7. Collector resistor 149 provides simple protection in the event of an accidental shorting of the output 150 and frequency stability is achieved by resistors 143, 145, 153 and capacitors 154 and 155.

Figure 9:
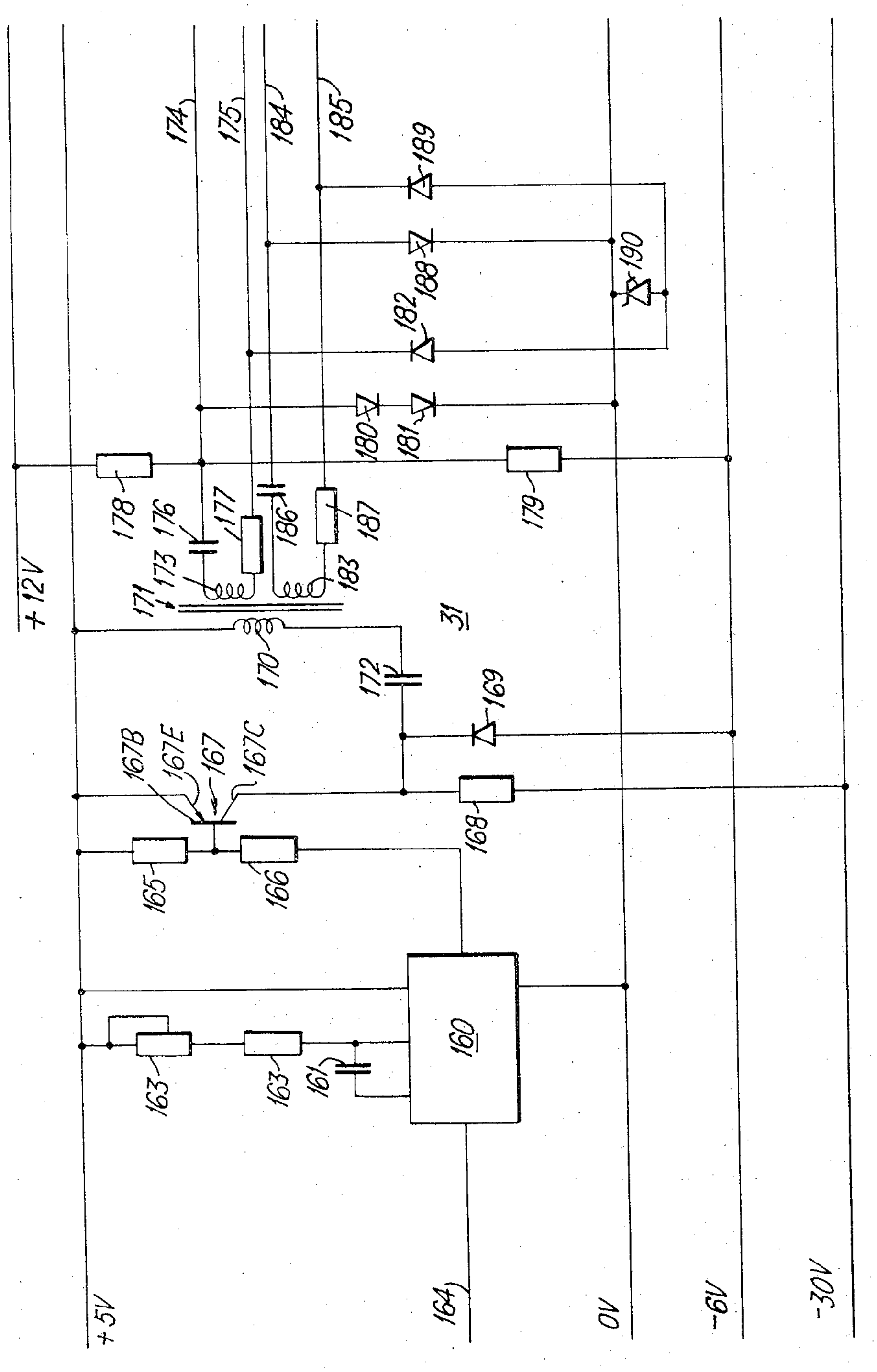
FIG. 9 is a circuit diagram of the control pulse generator in the embodiment of FIG. 2.

FIG. 9 illustrates circuitry for embodying the control pulse generator 31 of FIG. 2, such circuitry serving to generate control pulses of suitable width and plane for controlling the operation of the three gate circuits 24, 26 and 29. As shown in FIG. 9, the control pulse generator 31 includes an integrated circuit monostable 160 of μA9601 type having an adjustment circuit connected to a +5V line. The adjustment circuit comprises an 82pF capacitor 161, a 5.1K resistor 162 and a variable resistor 163 (5K) set to provide an output pulse of 0.5 microsecond each time a start pulse is received at the monostable input 164. The output from the monostable 160 is fed via a voltage divider including resistors 165 and 166, respectively of 220 and 390 ohms to the base 167B of a switching transistor 167 serving to amplify the output from the monostable to about 7 volts. The emitter 167E of transistor 167 is connected to the +5V line and the output of transistor is delivered across 1K load resistor 168 connected between the collector 167C of transistor 167 and a line at –30V, in parallel with a diode 169 connected to a line at –6V and serving to clip and shape the output pulses from the transistor 167. The clipped pulses are fed to a primary winding 170 of a pulse transformer 171 through a 0.1μF isolating capacitor 172 which blocks any d.c. component to prevent saturation of the transformer core.

One secondary winding 173 of the pulse transformer 171 delivers control pulses at the outputs 174 and 175 which are connected to the control inputs 105 and 106 of the FIG. 6 circuitry to control the operation of diode gate circuit 24. A 0.1μF capacitor 176 connected in the secondary winding 173 provides for correct biasing and a 100Ω resistor 177 connected in the winding 173 limits the current flow to prevent excessive bias being applied to the diodes 90 to 93 of FIG. 6 or the overloading of the transistor 167. Resistors 178 and 179, respectively of 2.2K and 4.7K, are connected between lines at + 12 and – 6 volts to capacitor 176 thereby enabling the diodes 90 to 93 to be biased conducting if the pulses are widely spaced. Diodes 180, 181 and 182 and zener diode 190 connected between the winding 173 and a zero volts line limit the bias applied to the gate diodes 90 to 93 and assist in maintaining the desired charge on capacitor 176.

Another secondary winding 183 of the transformer 171 delivers control pulses at the outputs 184 and 185 which are connected to the control inputs 128 and 129 of the combined diode gate circuits 26, 29 of FIG. 7. A 0.1μF capacitor 186 connected in the winding 183 serves the same function as capacitor 176 in winding 173, resistor 187 is a current-limiting resistor, diodes 188 and 189 assist in maintaining the correct bias voltage on capacitor 186, and the zener diode 190 provides a 3 volts supply for limiting the amplitude of the control pulses. Diodes 180–182 and 188, 189 are 1N4148 type.

The fact that the integrator 22 in the apparatus described above is reset simultaneously with the acquisition of new charge obviates the need for a separate resetting operation and a consequent period of inoperation of the integrator.

Although the apparatus of the invention has been particularly described with reference to its use in conjunction with current pulses delivered by photodiode arrays, it will be appreciated that the apparatus is equally applicable in any circumstances where periodic current pulses, e.g., in a communications system, are to be integrated at high speeds.

What is claimed is:

1. Apparatus for converting a sequence of electrical current pulses into a sequence of steady voltage levels each of which has a magnitude significant of the charge content of a respective current pulse, which apparatus includes:

an integrator having an input to receive the current pulses, said integrator being operative to perform integration of each pulse over its duration and to deliver at an output thereof an integration output voltage;

a first follow and hold circuit which has an input for receiving the output voltage of the integrator and an output for holding a steady voltage level corresponding to the output voltage of the integrator at the completion of the integration of a pulse;

a normally open first gate circuit connected between the output of the integrator and the input of the first follow and hold circuit;

a second follow and hold circuit which has an input for receiving the steady voltage level from the output of the first follow and hold circuit and which is operative to deliver the steady voltage corresponding to each current pulse until another voltage level corresponding to a succeeding current pulse is received from the first follow and hold circuit;

a normally closed second gate circuit connected between the output of the first follow and hold circuit and the input of the second follow and hold circuit;

a normally closed third gate circuit connected between the output of the first follow and hold circuit and the input of the integrator; and, a control pulse generator which is operative to deliver a control pulse to each of the gate circuits at the beginning of the integration of a current pulse to reverse the condition of each gate for the duration of the control pulse, thereby to close the first gate circuit to isolate the first follow and hold circuit from the integrator, to open the second gate circuit to feed the steady voltage level corresponding to a preceding current pulse from the first follow and hold circuit to the second follow and hold circuit, and to open the third gate circuit to feed the integrator with a reset signal proportional to the steady voltage level corresponding to the preceding current pulse so that the output voltage of the integrator at the completion of the integration of a current pulse is significant of the charge content of that pulse.

2. Apparatus as claimed in claim 1, including an adding network having a first input to receive the current pulses, a second input to receive the reset signal and an output connected to the input of the integrator.

3. Apparatus as claimed in claim 1, including an output amplifier stage connected to the second follow and hold circuit and operative to amplify the voltage level delivered by the second follow and hold circuit and to buffer the final output from the second follow and hold circuit.

4. Apparatus as claimed in claim 2, for use with low level current pulses, which apparatus includes an input amplifier for receiving the current pulses and providing low drift current amplification thereof, such amplifier having its output connected to the first input of the adding network.

* * * * *